(12) United States Patent
Inakura

(10) Patent No.: US 9,818,444 B2
(45) Date of Patent: Nov. 14, 2017

(54) INFORMATION PROCESSING APPARATUS, CONTROL METHOD THEREOF, AND PROGRAM

(71) Applicant: CANON KABUSHIKI KAISHA, Tokyo (JP)

(72) Inventor: Keita Inakura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/217,872

(22) Filed: Jul. 22, 2016

(65) Prior Publication Data

US 2017/0032816 A1   Feb. 2, 2017

(30) Foreign Application Priority Data

Jul. 30, 2015   (JP) ................................. 2015-151028
Jul. 30, 2015   (JP) ................................. 2015-151029

(51) Int. Cl.
| | | |
|---|---|---|
| H04N 5/775 | (2006.01) | |
| H04N 5/93 | (2006.01) | |
| G11B 15/22 | (2006.01) | |
| G11B 27/34 | (2006.01) | |
| H04N 21/482 | (2011.01) | |
| H04N 21/472 | (2011.01) | |
| G06F 3/048 | (2013.01) | |
| H04N 21/41 | (2011.01) | |
| H04N 5/76 | (2006.01) | |

(52) U.S. Cl.
CPC .............. *G11B 15/22* (2013.01); *G06F 3/048* (2013.01); *G11B 27/34* (2013.01); *H04N 5/76* (2013.01); *H04N 21/4122* (2013.01); *H04N 21/4126* (2013.01); *H04N 21/47217* (2013.01); *H04N 21/4821* (2013.01); *H04N 21/4825* (2013.01)

(58) Field of Classification Search
CPC .... G11B 15/22; G11B 27/34; H04N 21/4825; H04N 21/47217; H04N 21/4122; H04N 21/4126; H04N 21/4821; H04N 5/76; G06F 3/048
USPC ....... 386/230, 248, 278, 282, 326, 328, 341, 386/351, 353
See application file for complete search history.

(56) References Cited

U.S. PATENT DOCUMENTS

2011/0170390 A1\*  7/2011  Hirota .................. G11B 27/105
                                                                 369/53.2

FOREIGN PATENT DOCUMENTS

JP       2003-032509 A     1/2003

\* cited by examiner

*Primary Examiner* — Robert Chevalier
(74) *Attorney, Agent, or Firm* — Canon U.S.A., Inc. IP Division

(57) ABSTRACT

When displaying a plurality of reduced content items corresponding to original content items in a list, reduced content corresponding to original content being reproduced on an external video reproduction device is displayed in a second display mode different from a first display mode for other reduced content items. An instruction to perform a predetermined process on original content related to the reduced content displayed in the second display mode is accepted in response to a user operation on the reduced content. An identifier of the reduced content and the instruction to perform the predetermined process on the original content associated with the identifier are transmitted to an external device.

8 Claims, 11 Drawing Sheets

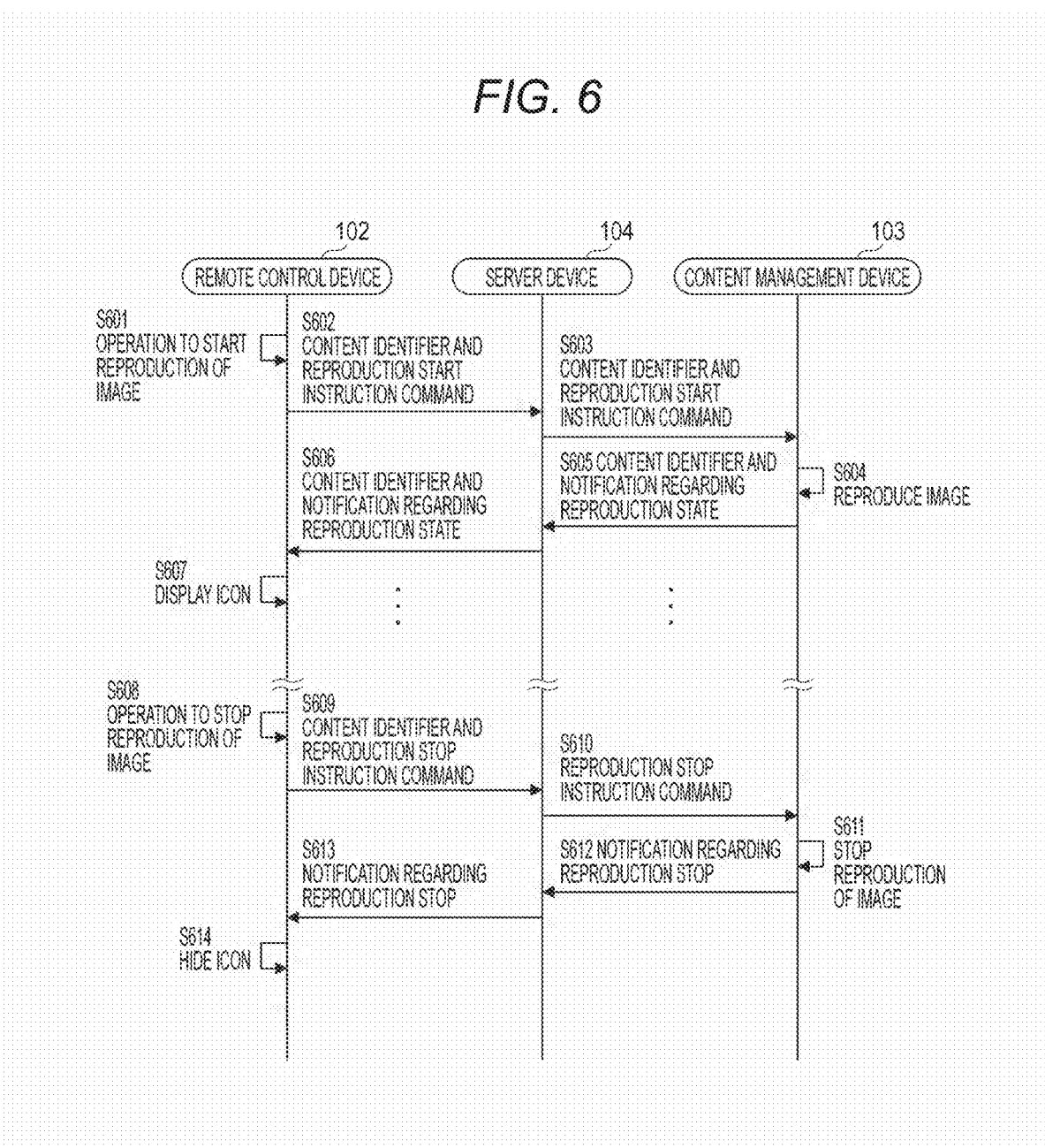

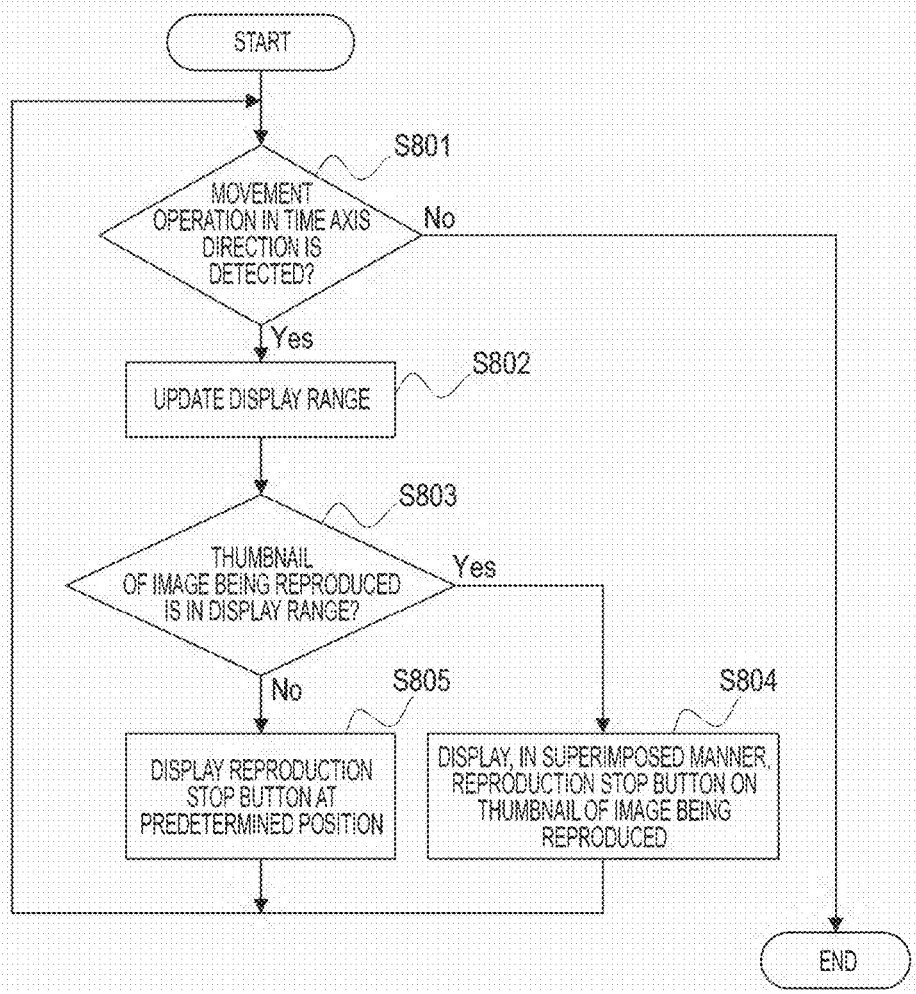

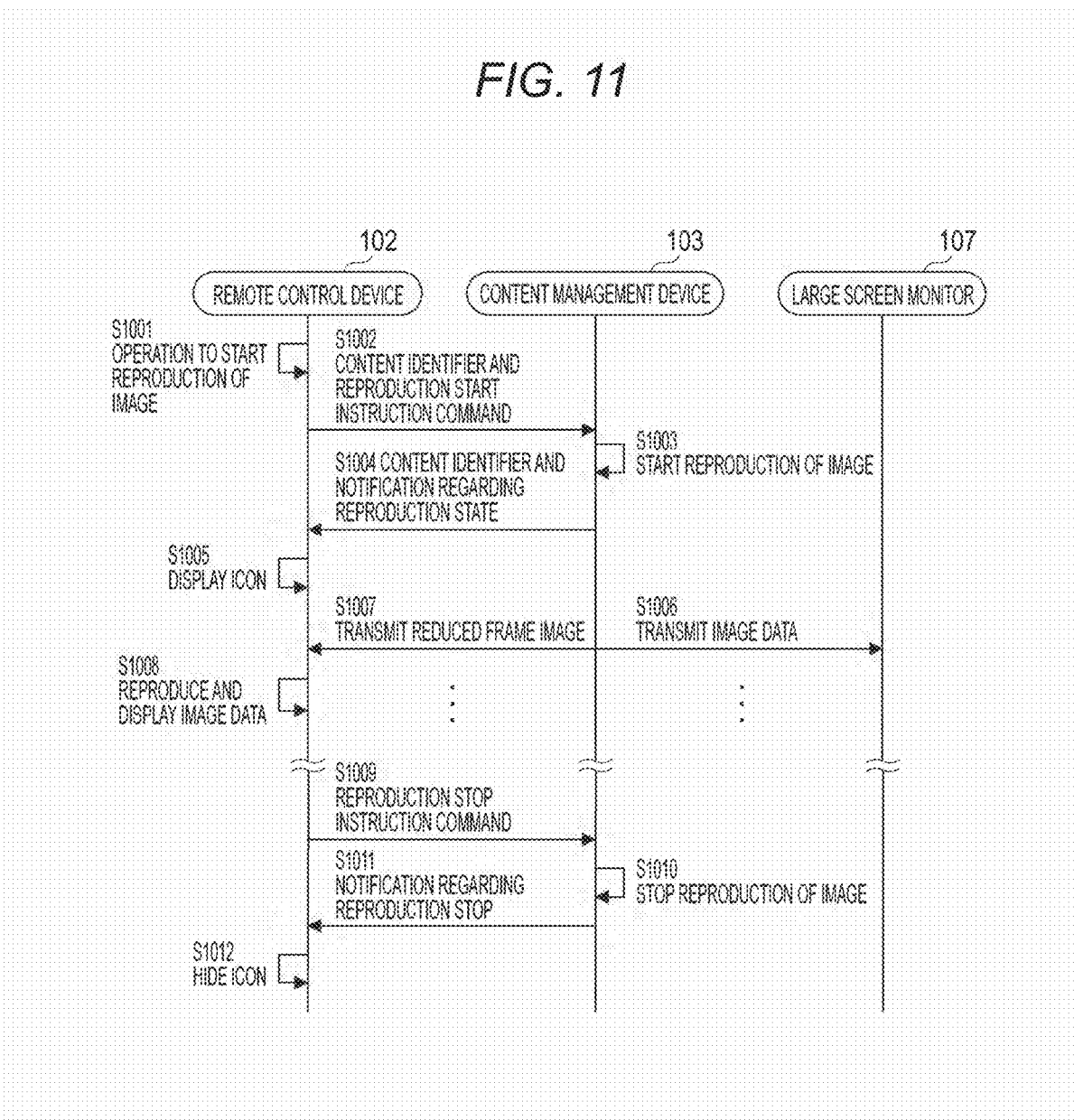

INFORMATION PROCESSING APPARATUS, CONTROL METHOD THEREOF, AND PROGRAM

BACKGROUND

Field

Aspects of the present invention generally relate to an information processing apparatus for identifying content reproduced and displayed by an external device, a control method thereof, and a program.

Description of the Related Art

Conventionally, there is a remote control device for communicating with a video display device, for selecting desired content from a plurality of content items recorded in a recording medium of the video display device, and for issuing an instruction to reproduce the content.

With respect to the above, there is a demand for enhancing the usability of the remote control device by enabling the following to be performed by a user: displaying a list of a plurality of content items, identifying content being reproduced by the video display device, and issuing an instruction to stop reproduction of the content.

SUMMARY

According to an aspect of the present application, an information processing apparatus for displaying a list of reduced content items associated with identifiers allowing identification of original content items includes an acquisition unit configured to acquire an identifier of original content being reproduced by an external video reproduction device, a display control unit configured to control reduced content associated with the acquired identifier, from among a plurality of the reduced content items displayed in the list, to be displayed in a second display mode different from a first display mode for other reduced content items, an accepting unit configured to accept, in response to a user operation for the reduced content, an instruction to perform a predetermined process on the original content related to the reduced content displayed in the second display mode, and a transmission unit configured to transmit, to an external device, an identifier of the reduced content and the instruction to perform the predetermined process on the original content associated with the identifier.

Further features of aspects of the present invention will become apparent from the following description of exemplary embodiments with reference to the attached drawings.

BRIEF DESCRIPTION OF THE DRAWINGS

FIG. 6 is a sequence diagram showing example operation of a system according to an embodiment of the present invention.

FIG. 8 is a flow chart showing example operation of a remote control device according to an embodiment of the present invention.

FIG. 11 is a sequence diagram showing example operation of a system according to an embodiment of the present invention.

DESCRIPTION OF THE EMBODIMENTS

Hereinafter, exemplary embodiments of the present invention will be described in detail with reference to the drawings. Additionally, structural elements described in the exemplary embodiments are only examples, and are not intended to limit the scope of aspects of the present invention.

First Embodiment

In a first exemplary embodiment, a data management device according to aspects of the present invention is realized as a data management system configured from a plurality of appliances.

Figure 1:
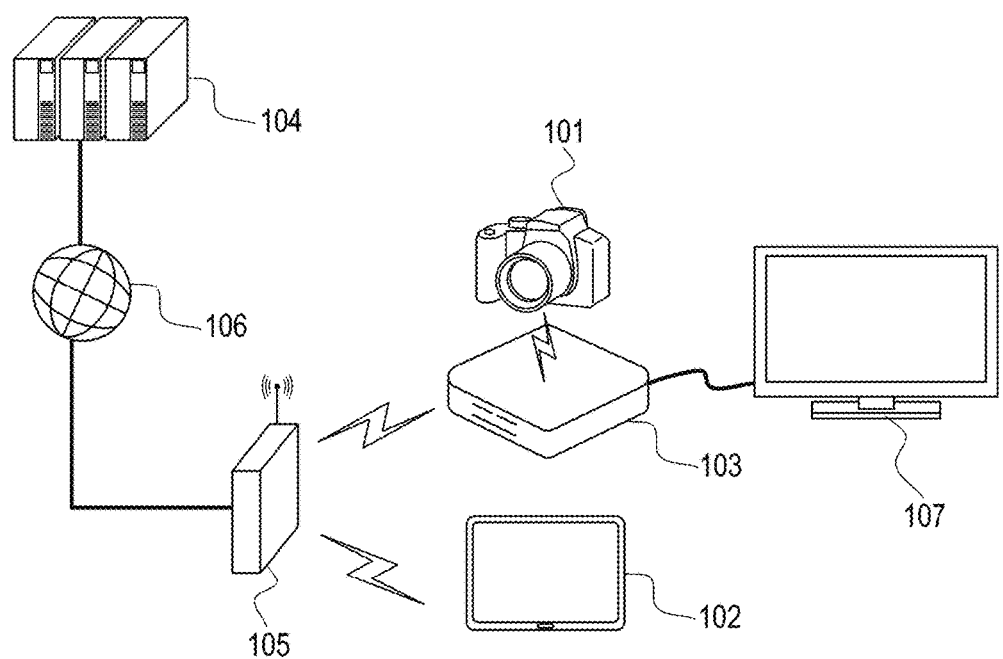
FIG. 1 is a block diagram showing an example configuration of a data management system according to an embodiment of the present invention.

A system configuration of the present exemplary embodiment will be described with reference to a system diagram in FIG. 1. The system includes a remote control device 102, a content management device 103, an image capturing device (e.g., digital camera) 101, a large screen monitor 107, a router 105 with an access point function, the Internet 106, and a server device 104. Content, such as a still image or a moving image captured by a user with the digital camera 101, is transmitted to the content management device 103 by wireless communication. The content management device 103 that receives the content assigns a content identifier to the content and accumulates original content items. Then, reduced content of the content taken in is generated. In the case where the content is a still image, the horizontal and vertical size is reduced to generate reduced content. In the case where the content is a moving image, two types of reduced content are generated, complete reduced content obtained by reducing the horizontal and vertical size of every frame of the moving image, and partial reduced content obtained by extracting at least one of the frames, such as frames for a predetermined period of time from the beginning of the moving image, and reducing the horizontal and vertical size of these frames. The reduced content is transmitted, together with the content identifier, from the router 105 with an access point function to the server device 104 over the Internet 106. Accordingly, the original content and the reduced content are managed under the same content identifier by the content management device 103 and the server device 104, respectively. Furthermore, attribute information is generated by the server device 104 for each reduced content received. The attribute information is auxiliary information about content, including an evaluation value, information indicating whether the content is to be deleted, and the like. In the present system, the content management device 103 accumulates original content items, the server device 104 accumulates reduced content items corresponding to the original content items, and the reduced content items are managed by a content library of the user in association with the attribute information. Moreover, original content and corresponding reduced content are associated with the same content identifier, and are saved in the content management device 103 and the server device 104, respectively. If the user possesses a plurality of digital cameras 101, the content library includes content items captured and generated by the plurality of digital cameras 101.

At the time of using the content library, the user performs operation from the remote control device 102. The remote control device 102 communicates with the server device 104 from the router 105 with an access point function over the Internet 106. By acquiring reduced content or the attribute information in the server device 104 and displaying the same on a monitor of the remote control device 102, an environment for accessing the content library is provided. The present system in which the remote control device 102 uses reduced content items accumulated in the server device 104 enables quick processing even if the processing capability of the remote control device 102 is poor.

A monitor 208 of the remote control device 102 includes a touch panel function. A control command set in advance is transmitted, according to an operation performed on the monitor 208 by the user, from the router 105 with an access point function to the server device 104 over the Internet 106. The server device 104 performs a process according to the received control command as well as serves to relay the control command to the content management device 103 as necessary. An environment enabling the user to use the content library can be provided by coordination of the remote control device 102, the content management device 103, and the server device 104.

Typically, the content library is used to display and view desired content on the large screen monitor 107 connected to the content management device 103. A user selects content to be displayed on the large screen monitor 107 by viewing reduced content items on the remote control device 102 and issuing a display instruction. A display instruction command including the content identifier of the display target content as an argument is transmitted from the remote control device 102, which received the display instruction, to the server device 104, and is transferred from the server device 104 to the content management device 103. The content management device 103 that received the display instruction command specifies the original content including the content identifier from the accumulated content items, and displays the original content on the large screen monitor 107. That is, a user is enabled to issue a display instruction from the remote control device 102 by a quick operation using the reduced content, and to view high-quality video on the large screen monitor 107 using the original content in the content management device 103.

A case where exchange of various pieces of data and commands between the remote control device 102 and the content management device 103 through the server device 104 will now be described. In another exemplary embodiment, the pieces of information can be directly exchanged between the remote control device 102 and the content management device 103.

A configuration of a computer device configuring the remote control device 102 of the present exemplary embodiment will be described with reference to the block diagram in FIG. 2. The remote control device 102 can be realized by a single computer device, or can be realized by distributing functions to a plurality of computer devices as necessary. In the case of configuration by a plurality of computer devices, the devices are connected by a Local Area Network (LAN) or the like, thus enabling communication with each other. Specifically, the remote control device 102 is realized by an information processing apparatus, such as a tablet terminal.

Figure 2:
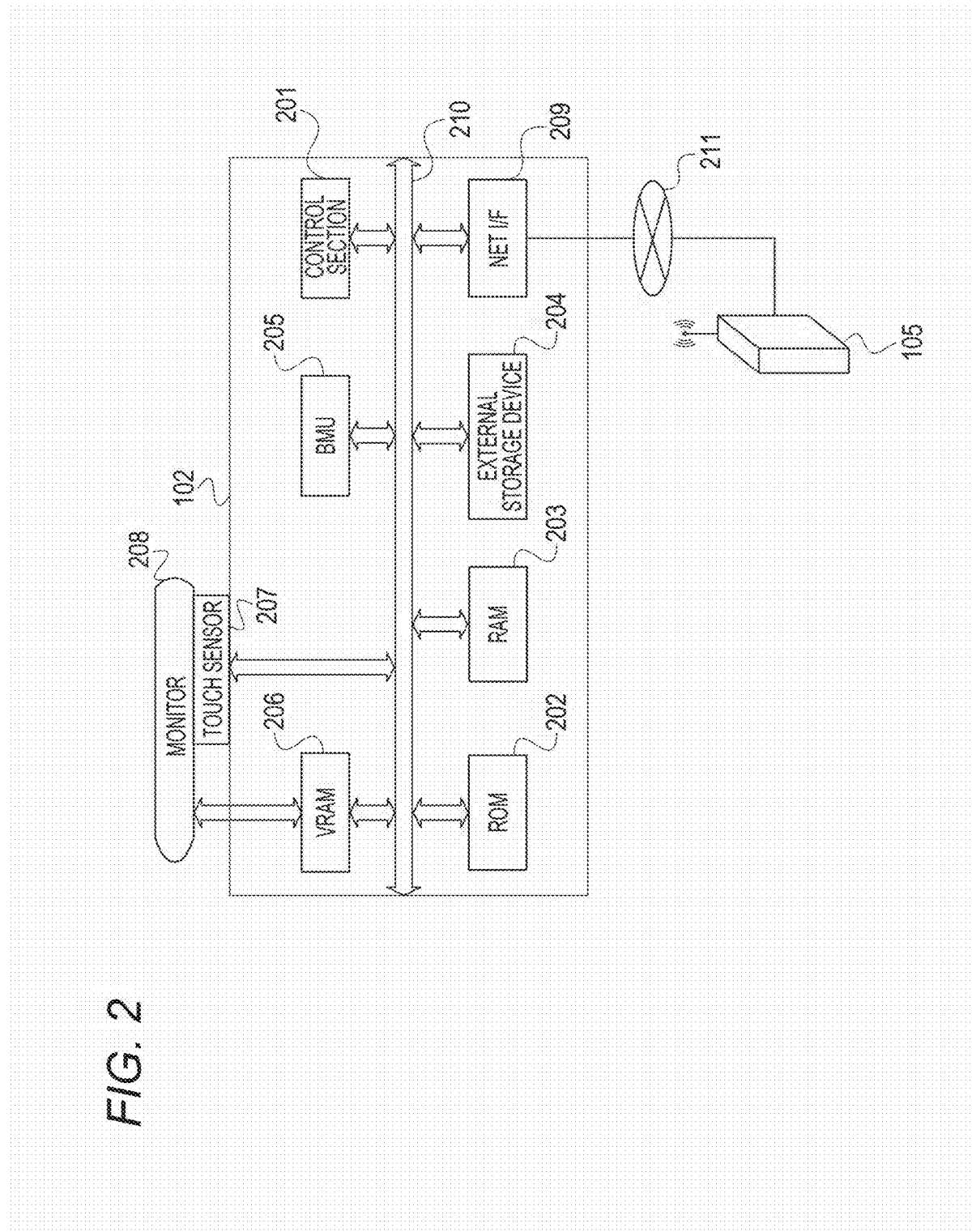
FIG. 2 is a block diagram showing an example configuration of a remote control device according to an embodiment of the present invention.

In FIG. 2, a control section 201 is a central processing unit (CPU), for example, that controls the entire remote control device 102. Read only memory (ROM) 202 is non-volatile memory that can be rewritten, and stores programs of an operating system (OS) and the like, and programs supplied by an external device. Random access memory (RAM) 203 is volatile memory, and temporarily stores programs and data. An external storage device 204 is, for example, a hard disk drive (HDD) that fixedly installed in the remote control device 102. The external storage device 204 can be a solid state drive (SSD), including a flash memory, a hybrid drive using a combination of a hard disk and a flash memory, a memory card, or the like. The external storage device 204 stores, for example, reduced content items acquired from the server device 104. The external storage device 204 also stores software programs of the OS, a content management application program (described below), and the like.

A bit move unit (BMU) 205 controls data transfer between, for example, memories (for example, between VRAM 206 and another memory) and between a memory and each I/O device (such as a network interface 209). The video RAM (VRAM) 206 draws an image displayed by the display device (monitor) 208. An image generated by the VRAM 206 is transmitted to the monitor 208 according to a predetermined specification, and the image is thereby displayed on the monitor 208. The monitor 208 is a touch panel including a touch sensor 207. The touch panel is an input device formed in a planar manner overlapping the monitor 208, and outputs coordinate information according to a touched position. The control section 201 detects the following operations on the touch panel: a touch on the touch panel with a finger or a pen (hereinafter referred to as a touch-down); a state of the touch panel being touched with a finger or a pen (hereinafter referred to as a touch-on); a movement of a finger or a pen touching the touch panel (hereinafter referred to as a movement); separation of a finger or a pen touching the touch panel (hereinafter referred to as a touch-up); and a state in which nothing is in contact with the touch panel (hereinafter referred to as a touch-off). These operations and position coordinates of a finger or a pen touching the touch panel are provided to the control section 201, and the control section 201 determines, based on the notified information, what operation is performed on the touch panel. Regarding a movement, the movement direction of a finger or a pen moving on the touch panel can also be determined, based on a change in the position coordinates, for each vertical component/horizontal component on the touch panel. When a touch-up is performed after a movement of a predetermined distance or more from a touch-down on the touch panel, it is assumed that dropping is performed after dragging (drag and drop). The touch panel can adopt any method from among various methods, including a resistive method, a capacitive method, a surface acoustic wave method, an infrared method, an electromagnetic induction method, an image recognition method, an optical sensor method, and the like.

The wireless network interface 209 communicates with the router 105 with an access point function by connecting to a wireless communication line 211. A system bus 210 connects each of the sections 201 to 209 in a manner enabling communication.

A configuration of a computer device configuring the content management device 103 of the present exemplary embodiment will be described with reference to the block diagram in FIG. 3. The content management device 103 can be realized by a single computer device by distributing functions to a plurality of computer devices as necessary. In the case of a configuration by a plurality of computer devices, the devices are connected by a Local Area Network (LAN) or the like so they can communicate with each other. Specifically, the content management device 103 is realized, for example, by a large-capacity storage device such as an external hard disk or a recorder.

Figure 3:
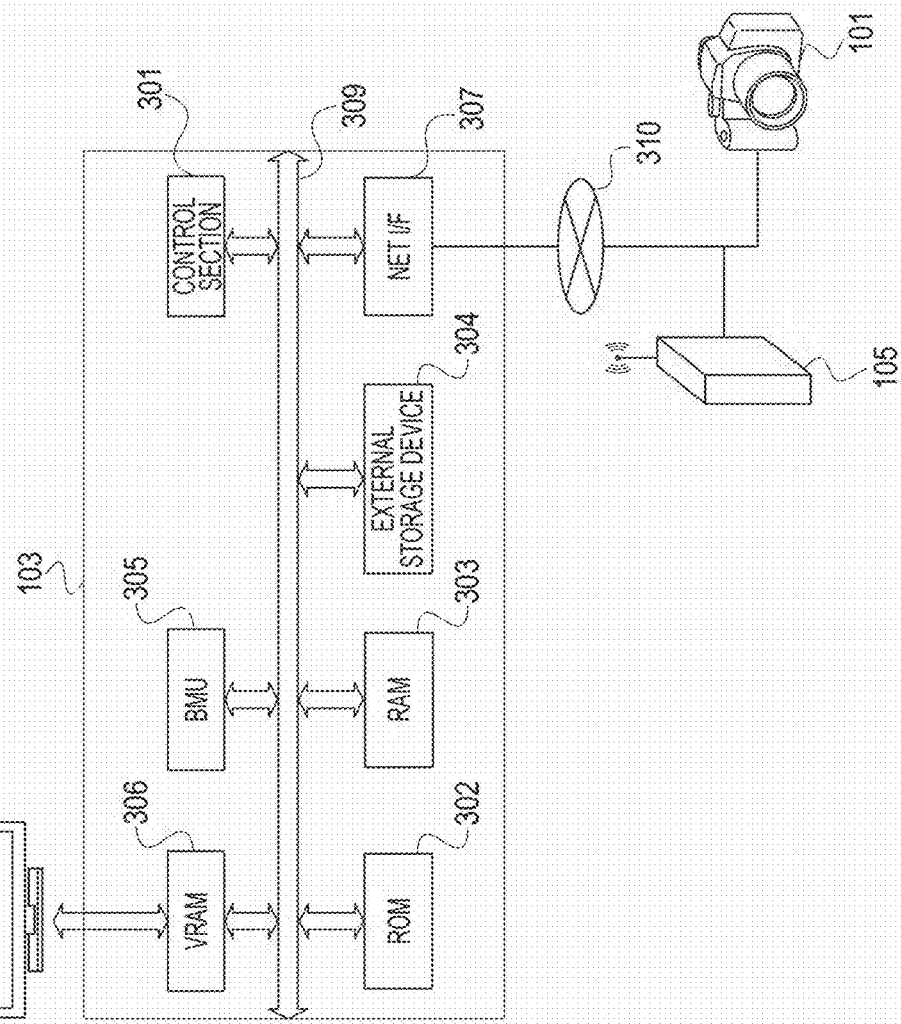
FIG. 3 is a block diagram showing an example configuration of a content management device according to an embodiment of the present invention.

In FIG. 3, a control section 301 is a central processing unit (CPU), for example, that controls the entire content management device 103. Read only memory (ROM) 302 is non-volatile memory that can be rewritten and stores programs of an operating system (OS) and the like, and programs supplied by an external device. Random access memory (RAM) 303 is volatile memory and temporarily stores programs and data. An external storage device 304 is, for example, a hard disk drive (HDD) fixedly installed in the content management device 103. The external storage device 304 can also be a solid state drive (SSD) including a flash memory, a hybrid drive using a combination of a hard disk and a flash memory, a memory card, or the like. The external storage device 304 stores original content items acquired from the digital camera 101.

A bit move unit (BMU) 305 controls data transfer, for example, between memories (for example, between VRAM 306 and another memory) and between a memory and each I/O device (such as a network interface 307). The video RAM (VRAM) 306 draws an image displayed on the large screen monitor 107. An image generated by the VRAM 306 is transmitted to the large screen monitor 107 according to a predetermined specification, and the image is thereby displayed on the large screen monitor 107.

The wireless network interface 307 communicates with the router 105 with an access point function by connecting to a wireless network line 310, and communicates with the digital camera 101 by connecting to the wireless network line 310. A system bus 309 connects each of the sections 301 to 307 in a manner enabling communication.

A configuration of a computer device configuring the server device 104 of the present exemplary embodiment will be described with reference to the block diagram in FIG. 4. The server device 104 can be realized by a single computer device or by distributing functions to a plurality of computer devices as necessary. In the case of configuration by a plurality of computer devices, the devices are connected by a Local Area Network (LAN) or the like so they can communicate with each other. Specifically, the server device 104 is realized, for example, by an information processing apparatus such as a cloud server.

Figure 4:
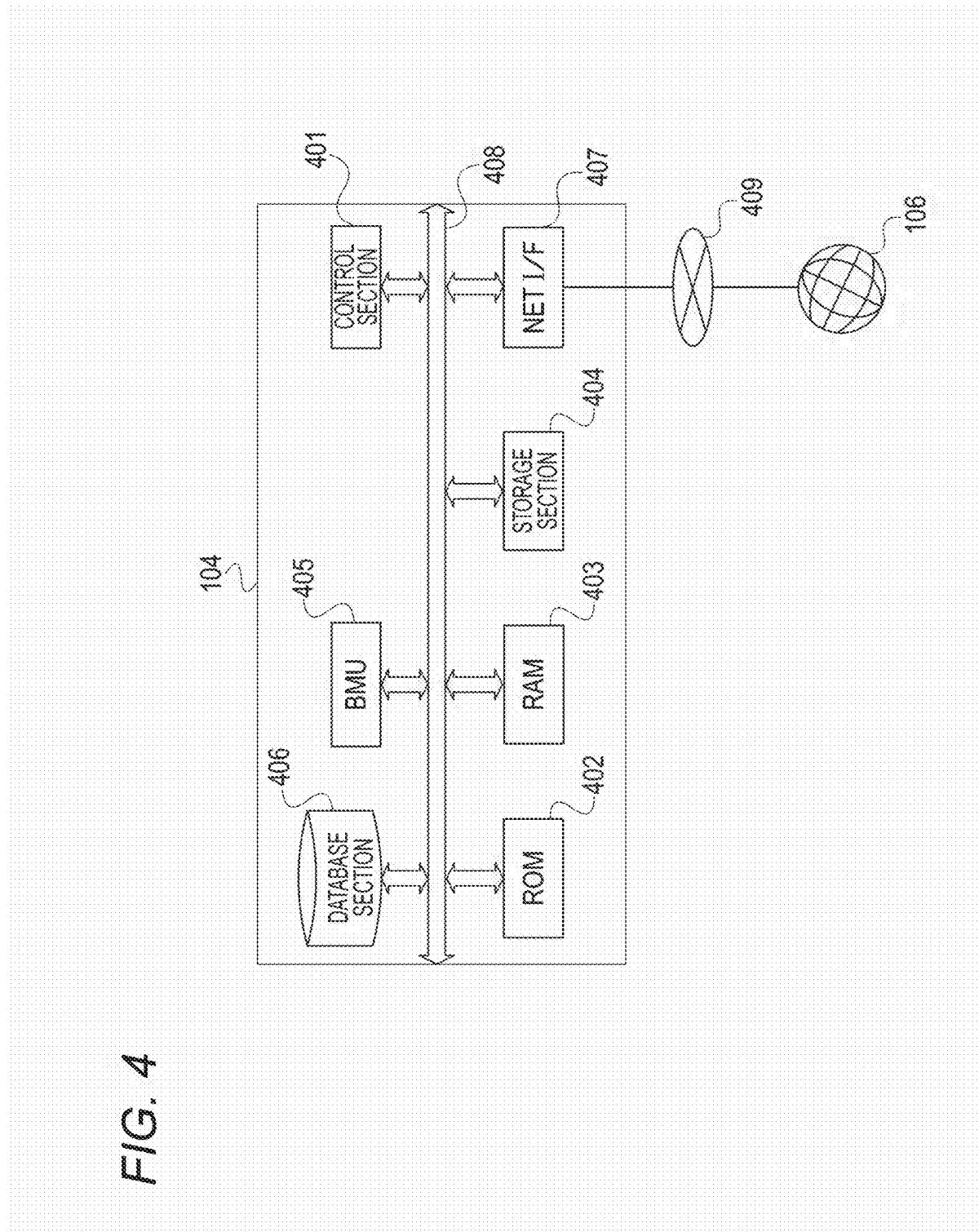
FIG. 4 is a block diagram showing an example configuration of a server device according to an embodiment of the present invention.

In FIG. 4, a control section 401 is a central processing unit (CPU), for example, that controls the entire server device 104. Read only memory (ROM) 402 is non-volatile memory that can be rewritten and stores programs of an operating system (OS) and the like and programs supplied by an external device. Random access memory (RAM) 403 is volatile memory and temporarily stores programs and data. A storage section 404 is, for example, a hard disk drive (HDD) fixedly installed in the server device 104, a solid state drive (SSD) including a flash memory, a hybrid drive using a combination of a hard disk and a flash memory, a memory card, or the like. The storage section 404 stores reduced content items transmitted from the content management device 103, and attribute information, about content, generated by the server device 104, the attribute information including an evaluation value, information indicating whether the content is to be deleted, and the like.

A bit move unit (BMU) 405 controls data transfer, for example, between memories (for example, between a database section 406 and another memory) and between a memory and each I/O device (such as a wired network interface 407). The database section 406 includes a management function for enhancing a retrieval performance for reduced content or attribute information of content recorded in the storage section 404. An area in the storage section 404 where content according to a predetermined condition is recorded can thereby be known.

The wired network interface 407 connects to the Internet 106 by connecting to a network line 409. A system bus 408 connects each of the sections 401 to 408 in a manner enabling communication.

Figure 5A:
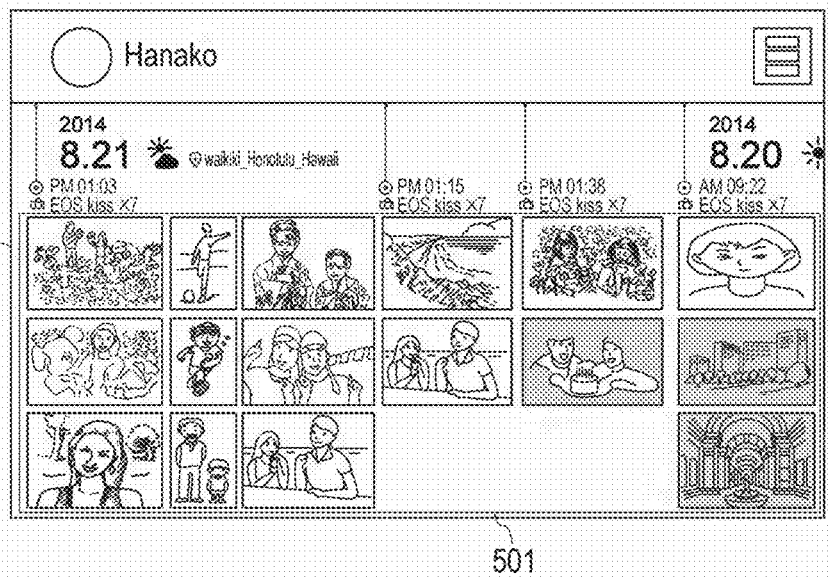
FIGS. 5A and 5B are diagrams showing examples of a content list screen according to an embodiment of the present invention.
Figure 5B:
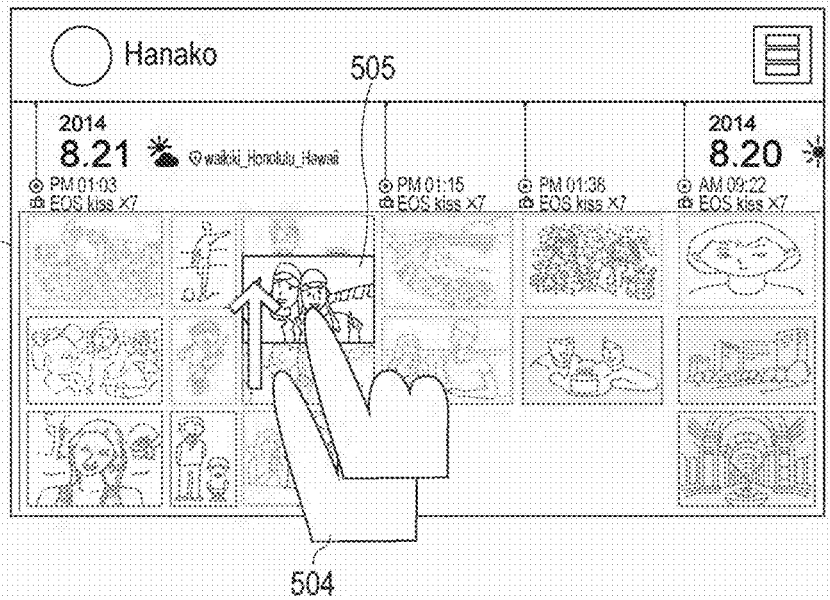

FIG. 5A is an example of a thumbnail list screen displayed when a content management application program (hereinafter referred to as a content management application) is started by the control section 201 of the remote control device 102 in response to an operation by a user. The control section 201 performs display control of displaying a list on the monitor 208 by acquiring thumbnail images, as reduced content items, from the server device 104 through the wireless network interface 209 and by developing the images in the VRAM 206. A thumbnail list screen 500 is a GUI for performing operation regarding control on the content library managed by the server device 104 or the content management device 103. Thumbnails acquired from the server device 104 are displayed in a thumbnail display region 501 in the order of date and time of capturing. FIG. 5B is a diagram for describing an operation for displaying and reproducing, on the monitor 107, original content held by the content management device 103 by using the thumbnail list screen 500. An instruction member 504 of a user is moved to a predetermined position by an upward movement operation in a direction intersecting a time axis of the thumbnail list screen 500 while a touch-on is performed on a thumbnail image to be reproduced. Upon detection of such an operation by the control section 201, the identifier of the thumbnail image and an image reproduction command are transmitted to the content management device 103 through the server device 104. Additionally, thumbnail images other than the reproduction target thumbnail image can be greyed out when an upward movement operation is detected in FIG. 5B, or an animation effect of causing the reproduction target thumbnail image to move out of the screen after reaching a predetermined position can be used. This enables a user to recognize that the operation is being detected. When transmission of the image reproduction command is complete, the control section 201 returns the thumbnail list screen to a display mode as shown in FIG. 5A.

Operation for performing a reproduction process of a moving image, as original content, by the system of the present exemplary embodiment will be described with reference to the sequence diagram in FIG. 6. The following operation is realized by executing the OS and predetermined application programs by the control section 201 of the remote control device 102, and by controlling each section of the remote control device 102 accordingly. The operation is also realized by executing the OS and predetermined application programs by the control section 401 of the server device 104, and by controlling each section of the server device 104 accordingly. Furthermore, the operation is realized by executing the OS and predetermined application programs by the control section 301 of the content management device 103, and by controlling each section of the content management device 103 accordingly. Communication between the remote control device 102 and the server device 104, and between the server device 104 and the content management device 103 is performed according to communication standards such as HTTP.

Figure 7A:
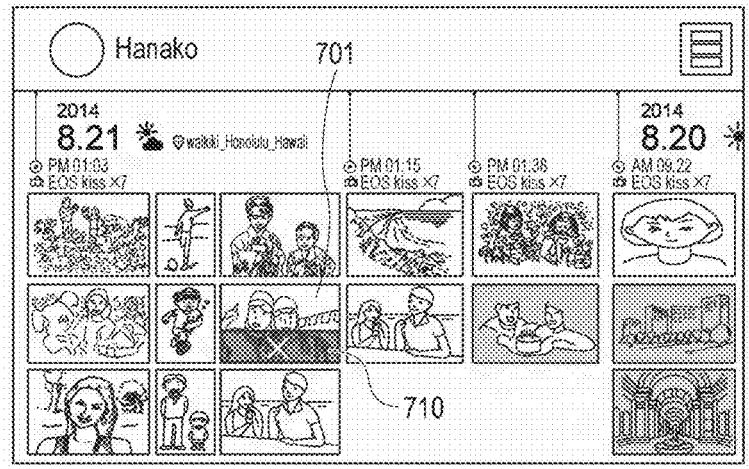
FIGS. 7A to 7C are diagrams showing examples of a content list screen according to an embodiment of the present invention.

As described above, the remote control device 102 detects a movement operation on a thumbnail image on the thumbnail list screen 500 (S601). In response, the remote control device 102 transmits, to the server device 104, the content identifier of the thumbnail image and a reproduction start instruction command that is an instruction to start reproduction of the moving image corresponding to the thumbnail image (S602). Upon receipt of the content identifier and the reproduction start instruction command, the server device 104 transmits the same to the content management device 103 storing the moving image corresponding to the content identifier (S603). Upon receipt of the content identifier and the reproduction start instruction command, the content management device 103 reads the moving image associated with the content identifier from the external storage device 304. Then, control is performed to display and reproduce the moving image on the large screen monitor 107 by decoding the moving image read out, developing the same on the VRAM 306, and transmitting the same to the monitor 107 (S604). The content management device 103 monitors the reproduction state of the moving image on the large screen monitor 107, and regularly notifies the server device 104 of the content identifier and the reproduction state (S605). Upon receipt of the content identifier and the reproduction state, the server device 104 determines whether there is a change in the reproduction state, and if there is a change, notifies the remote control device 102 of the content identifier and the reproduction state (S606). The remote control device 102 performs display control so that an icon corresponding to the reproduction state is displayed near the thumbnail image corresponding to the received content identifier (S607). As shown in FIG. 7A, a reproduction stop button 710, displayed as the icon, is superimposed on a thumbnail image 701. Moreover, the processes from step S604 to step S606 are sequentially repeated for each frame until a frame at the end of the moving image is reproduced or there is an instruction, as described below, to stop reproduction. Additionally, automatic selection and reproduction of the next moving image can occur after reproduction of a frame at the end of the moving image. In this case, the processes from step S604 to step S606 are performed for the next moving image.

The remote control device 102 detects a touch-on on the reproduction stop button 710 in response to a user operation (S608). In response, the content identifier of the thumbnail image 701 on which the reproduction stop button 710 is superimposed and the reproduction stop instruction command that is an instruction to stop reproduction of the movie image corresponding to the thumbnail image are transmitted to the server device 104 (S609). When the content identifier and the reproduction stop instruction command are received, the server device 104 transmits the reproduction stop instruction command to the content management device 103 storing the moving image associated with the content identifier (S610). In the case where only one moving image is reproduced on the large screen monitor 107, the content identifier does not have to be transmitted to the content management device 103 in step S610.

When the reproduction stop instruction command is received, the content management device 103 stops decoding the moving image being reproduced, initializes the VRAM 306, places the large screen monitor 107 in a display mode before reproduction of the moving image. The content management device 103 notifies the server device 104 that, as a result of monitoring the reproduction state of the moving image on the large screen monitor 107 (S612), reproduction of the moving image has stopped and the server device 104 transfers the notification to the remote control device 102 (S613). Upon receipt of the notification that reproduction of the moving image has stopped, the remote control device hides the reproduction stop button 710.

Operation by the remote control device 102 when a movement operation in a time axis direction of the thumbnail display region 501 is detected in response to a user operation when the reproduction stop button 710 is displayed on the thumbnail list screen 500 will be described with reference to the flow chart in FIG. 8. The following operation is realized by executing the OS and predetermined application programs by the control section 201 of the remote control device 102 and by controlling each section of the remote control device 102 accordingly.

When a movement operation in the time axis direction of the thumbnail display region 501 is detected in response to a user operation (S801), the control section 201 changes a display target time range in the thumbnail display region 501 (S802). Then, the control section 201 determines whether the thumbnail image corresponding to the moving image displayed on the large monitor is included in the time range after change (S803). In the case where the thumbnail image is included (Yes in S803), thumbnail images associated with the capturing times included in the time range after change are read from the external storage device 204. Then, the newly read thumbnail images are displayed in the thumbnail display region 501, and the reproduction stop button is displayed superimposed on the thumbnail image corresponding to the moving image being reproduced (S804).

Figure 7B:
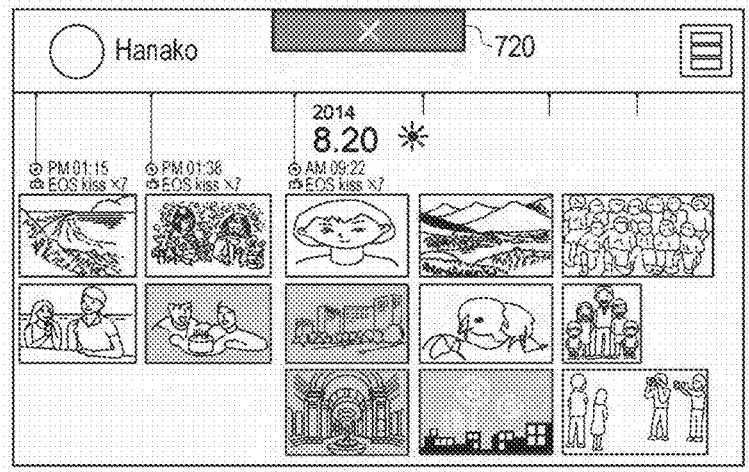

On the other hand, in the case where the thumbnail image is not included (No in S803), thumbnail images associated with the capturing times included in the time range after change are read from the external storage device 204. Then, as shown in FIG. 7B, the newly read thumbnail images are displayed in the thumbnail display region 501, and a reproduction stop button 720 is displayed at a predetermined position (S805).

To smoothly update the display on the thumbnail list screen 500, a drawing plane for a list of thumbnails including thumbnail images corresponding to capturing times included in a wider time range than the time range after change is drawn beforehand in the RAM 203 by the control section 201. Then, the BMU 205 transfers the drawing plane to the VRAM 206 while shifting according to the amount of movement by the movement operation.

An example where the reproduction stop button is displayed superimposed on the thumbnail image is described as an example of display of the reproduction stop button near the thumbnail images. Alternatively, the display can be performed next to the thumbnail image.

A thumbnail image corresponding to a moving image being reproduced can be displayed by being surrounded by a frame of a predetermined color or of a predetermined width as long as it can be distinguished from other thumbnail images. In this case, when a touch-on is detected on the thumbnail image itself, a reproduction stop command is transmitted, as with the reproduction stop instruction command.

Figure 7C:
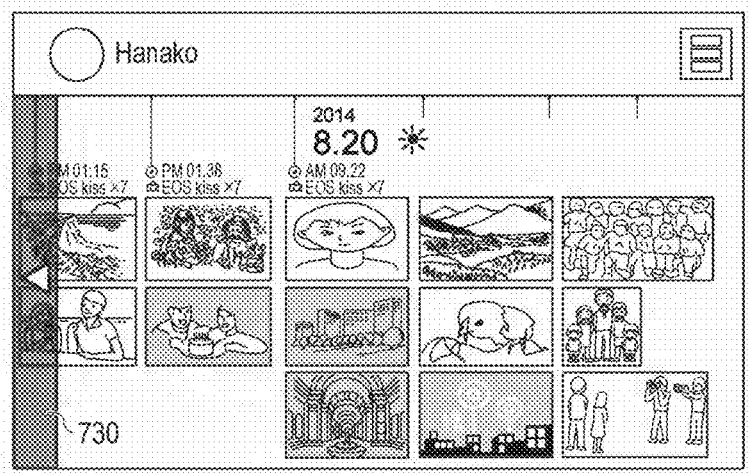
Figure 9:
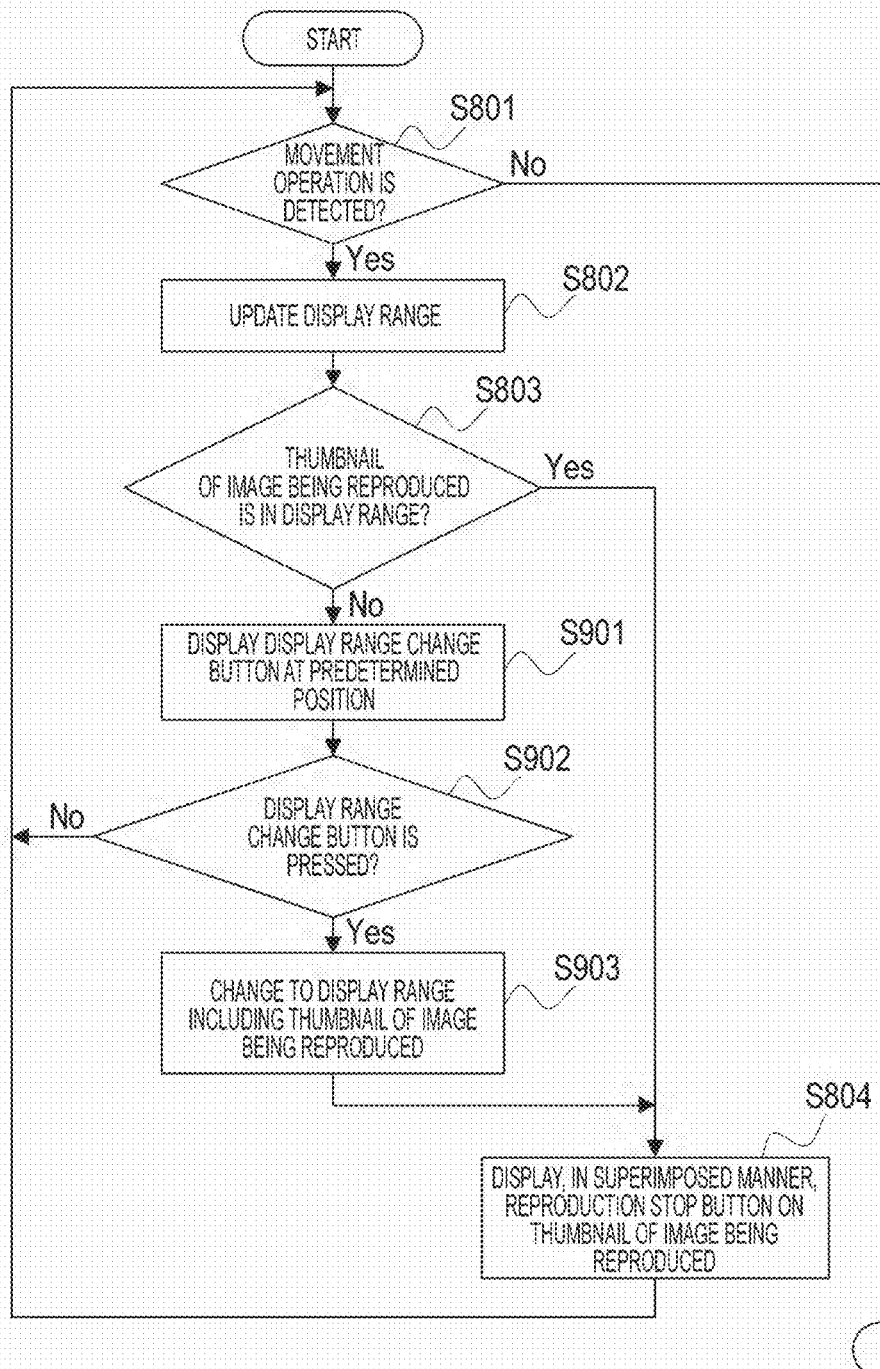
FIG. 9 is a flow chart showing example operation of a remote control device according to an embodiment of the present invention.

The remote control device 102 can operate in another mode of operation that is performed when a movement operation in the time axis direction of the thumbnail display region 501 is detected in response to a user operation when the reproduction stop button 710 is displayed on the thumbnail list screen 500. A description of this mode is provided with reference to the flow chart in FIG. 9. The following operation is realized by executing the OS and predetermined application programs by the control section 201 of the remote control device 102 and by controlling each section of the remote control device 102 accordingly. After steps S801 to S803 described above are performed, if the capturing time of the thumbnail image corresponding to the moving image being reproduced is not included in the time range after change (No in S803), a display range change button 730 is displayed at a predetermined position (S901), as shown in FIG. 7C. Thumbnail images associated with the capturing times included in the time range after change are read from the external storage device 204 and are displayed in the thumbnail display region 501 until the display range change button 730 is pressed.

When a press-down operation on the display range change button 730 is detected in response to a user operation (S902), the control section 201 changes the time range of the thumbnail display region 501 to include the capturing time of the moving image being reproduced (S903). Then, as in step S804, thumbnail images associated with the capturing times included in the time range after change are read from the external storage device 204. Then, the newly read thumbnail images are displayed in the thumbnail display region 501, and the reproduction stop button is displayed superimposed on the thumbnail image corresponding to the moving image being reproduced.

Second Embodiment

In the present embodiment, a case is described where a moving image is reproduced on the large screen monitor 107 and a thumbnail image is correspondingly reproduced on the thumbnail list screen of the remote control device 102.

Figure 10:
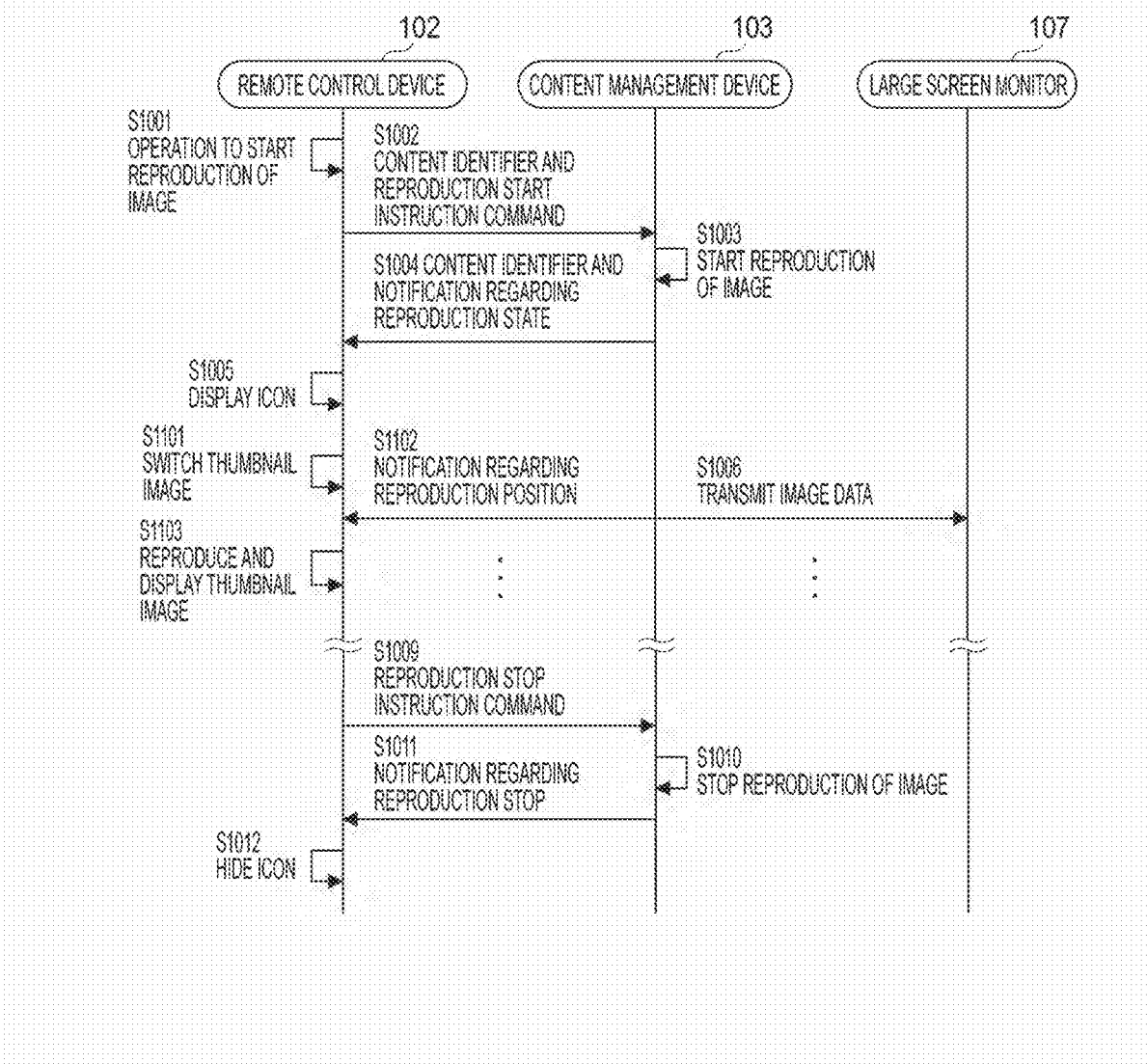
FIG. 10 is a sequence diagram showing example operation of a system according to an embodiment of the present invention.

Operation for performing a reproduction process of an original moving image as original content by a system of the present embodiment will be described with reference to the sequence diagram in FIG. 10. The following operation is realized by executing the OS and predetermined application programs by the control section 201 of the remote control device 102 and by controlling each section of the remote control device 102 accordingly. The operation can also be realized by executing the OS and predetermined application programs by the control section 301 of the content management device 103 and by controlling each section of the content management device 103 accordingly. The remote control device 102 and the content management device 103 exchange various control commands through the router 105 with an access point function.

The remote control device 102 detects, on the thumbnail list screen 500, an upward movement operation in a direction intersecting the time axis for a thumbnail image corresponding to a moving image in the manner described above (S1001). The thumbnail image corresponding to the moving image is a reduced moving image obtained by extracting at least one frame from among all the frames included in the moving image and by performing a reduction process on the frame(s). Then, the reduced image is repeatedly reproduced and displayed on the thumbnail list screen 500. A burden on the storage capacity of the RAM 203 or the external storage device 204 used for temporarily storing thumbnail images for display can thus be reduced.

In response to detection of the movement operation, the remote control device 102 transmits, to the content management device 103, the content identifier of the thumbnail image and a reproduction start instruction command that is an instruction to start reproduction of the moving image corresponding to the thumbnail image (S1002). The content management device 103 receives the content identifier and the reproduction start instruction command. In response, control is performed to display the moving image associated with the content identifier on the large screen monitor 107 by reading the moving image from the external storage device 304, decoding the same, developing the same on the VRAM 306, and transmitting the same to the monitor 107 (S1003). Then, the content management device 103 notifies the remote control device 102 of start of reproduction of the moving image together with the content identifier (S1004). In response, the remote control device 102 performs display control so that a thumbnail image corresponding to the received content identifier is displayed in a predetermined display mode (S1005).

The content management device 103 branches the moving image read from the external storage device 304 into two paths on a per-frame image basis. In one of the paths, the decoding process is performed on the frame image, and the frame image is developed on the VRAM 306 and transmitted to the monitor 107 (S1006). In the other path, the reduction process is performed on the frame image, and the frame image is transmitted to the remote control device 102 through the wireless network interface 307 (S1007). When the frame image is received, the remote control device 102 decodes the frame image, develops the same on the VRAM 206, and updates display of the corresponding thumbnail image on the thumbnail list screen 500 (S1008). In this manner, the same scene as the scene that being reproduced and displayed on the large screen monitor 107 is also displayed on the monitor 208 of the remote control device.

The processes from step S1006 to step S1008 are sequentially repeated for each frame until a frame at the end of the moving image is reproduced or there is an instruction, described below, to stop reproduction. Additionally, the next moving image can be automatically selected and reproduced after a frame at the end of the moving image is reproduced. In this case, the processes from step S1006 to step S1008 are repeated after the processes in steps S1004 and S1005 are performed for the next moving image.

In response to a user operation, the remote control device 102 transmits the reproduction stop instruction command to the content management device 103 (S1009). The content management device 103 stops the processes in steps S1007 and S1008 described above (S1010), and notifies the remote control device 102 (S1011). The remote control device 102 hides the icon displayed in step S1005 (S1012).

The remote control device 102 can store, in addition to a partial reduced moving image including reduced frame(s) corresponding to at least one frame of an original moving image, a full-length reduced moving image including reduced frames corresponding to all the frames of an original moving image. Operation of the present system in this case will be described with reference to the sequence diagram in FIG. 11. First, processes in steps S1001 to S1005 are performed. Here, a partial reduced moving image is reproduced and displayed as a thumbnail image. Then, in response to a notification in step S1004, the remote control device 102 switches the thumbnail image corresponding to the content identifier from a partial reduced moving image to a full-length reduced moving image (S1101). The content management device 103 notifies the remote control device 102 of a reproduction position corresponding to the frame being reproduced on the large screen monitor 107 (S1102). The remote control device 102 reproduces and displays the position, in the full-length reduced moving image, corresponding to the reproduction position as notified (S1103).

As described above, a movement operation in the time axis direction of the thumbnail display region 501 can be detected by the remote control device 102 in response to a user operation when a moving image is being reproduced on the large screen monitor 107 and the corresponding thumbnail image is being reproduced. When a movement operation in the time axis direction is detected, the time range displayed on the thumbnail list screen is changed, and the thumbnail image corresponding to the moving image being reproduced on the large screen monitor 107 may no longer be a display target. Also in such a case, the remote control device 102 continues receiving the reduced frame image, but stops executing the decoding and display processes. This reduces the processing burden on the control section 201 and the BMU 205. Moreover, when the time range is further changed, and the thumbnail image is again made a display target, the decoding and display processes are started again. This allows the reduced frame corresponding to the frame being reproduced on the large screen monitor 107 to be displayed on the monitor 208 of the remote control device 102 regardless of the period of time when display was stopped.

As described above, the frame image at the same position as the original moving image being reproduced by the video reproduction device (large screen monitor 107) is displayed on the monitor 208 of the remote control device 102. Accordingly, a user may easily recognize the thumbnail image corresponding to the original image being reproduced on the large screen monitor 107 from a plurality of thumbnail images displayed on the thumbnail list screen.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application Nos. 2015-151028, filed Jul. 30, 2015, and 2015-151029, filed Jul. 30, 2015, which are hereby incorporated by reference herein in their entirety.

What is claimed is:

1. An information processing apparatus for displaying a list of reduced content items associated with identifiers allowing identification of original content items, the information processing apparatus comprising:
   an acquisition unit configured to acquire an identifier of original content being reproduced by an external video reproduction device;
   a display control unit configured to control reduced content associated with the acquired identifier, from among a plurality of the reduced content items displayed in the list, to be displayed in a second display mode different from a first display mode for other reduced content items;
   an accepting unit configured to accept, in response to a user operation for the reduced content, an instruction to perform a predetermined process on the original content related to the reduced content displayed in the second display mode; and
   a transmission unit configured to transmit, to an external device, an identifier of the reduced content and the instruction to perform the predetermined process on the original content associated with the identifier.

2. The information processing apparatus according to claim 1, wherein the predetermined process is a process for stopping reproduction.

3. The information processing apparatus according to claim 1, wherein, in the second display mode, an icon is displayed together with the reduced content.

4. The information processing apparatus according to claim 3, wherein, when at least one of the plurality of reduced content items is displayed and the reduced content corresponding to the acquired identifier is not displayed, the display control unit displays the icon separately from the reduced content.

5. The information processing apparatus according to claim 1, further comprising a reception unit configured to receive, from the external device, a notification that the predetermined process on the original content associated with the transmitted identifier has been performed,
   wherein, in response to receipt of the notification, the display control unit controls the content to be displayed in the first display mode.

6. The information processing apparatus according to claim 1, further comprising:
   a selection unit configured to select one of the plurality of reduced content items in response to a user operation; and
   a second transmission unit configured to transmit, to the external device, an identifier of the selected reduced content and an instruction to start reproduction of original content associated with the identifier.

7. A control method of an information processing apparatus for displaying a list of reduced content items associated with identifiers allowing identification of original content items, the method comprising:
- acquiring an identifier of original content being reproduced by an external video reproduction device;
- controlling reduced content associated with the acquired identifier, from among a plurality of the reduced content items displayed in the list, to be displayed in a second display mode different from a first display mode for other reduced content items;
- accepting, in response to a user operation for the reduced content, an instruction to perform a predetermined process on the original content related to the reduced content displayed in the second display mode, in response to a user operation for the reduced content; and
- transmitting, to an external device, an identifier of the reduced content and the instruction to perform the predetermined process on the original content associated with the identifier.

8. A non-transitory computer readable storage medium storing computer executable instructions for causing an information processing apparatus for displaying a list of reduced content items associated with identifiers allowing identification of original content items to execute a control method, the control method comprising:
- acquiring an identifier of original content being reproduced by an external video reproduction device;
- controlling reduced content associated with the acquired identifier, from among a plurality of the reduced content items displayed in the list, to be displayed in a second display mode different from a first display mode for other reduced content items;
- accepting, in response to a user operation for the reduced content, an instruction to perform a predetermined process on the original content related to the reduced content displayed in the second display mode; and
- transmitting, to an external device, an identifier of the reduced content and the instruction to perform the predetermined process on the original content associated with the identifier.

* * * * *